United States Patent
Miyazaki

(10) Patent No.: US 10,745,254 B2
(45) Date of Patent: Aug. 18, 2020

(54) BRAKE DEVICE FOR BRAKING A HYDRAULIC MOTOR OF A TURNING BODY IN A WORKING MACHINE

(71) Applicant: SUMITOMO HEAVY INDUSTRIES CONSTRUCTION CRANES CO., LTD., Tokyo (JP)

(72) Inventor: Tadashi Miyazaki, Aichi (JP)

(73) Assignee: SUMITOMO HEAVY INDUSTRIES CONSTRUCTION CRANES CO., LTD., Tokyo (JP)

( * ) Notice: Subject to any disclaimer, the term of this patent is extended or adjusted under 35 U.S.C. 154(b) by 0 days.

(21) Appl. No.: 16/153,386

(22) Filed: Oct. 5, 2018

(65) Prior Publication Data

US 2019/0106306 A1 Apr. 11, 2019

(30) Foreign Application Priority Data

Oct. 10, 2017 (JP) ................................ 2017-197184

(51) Int. Cl.
*B66C 23/86* (2006.01)
*F15B 11/044* (2006.01)
(Continued)

(52) U.S. Cl.
CPC .............. *B66C 23/86* (2013.01); *B66C 13/20* (2013.01); *B66C 23/54* (2013.01); *E02F 9/128* (2013.01);
(Continued)

(58) Field of Classification Search
CPC ........ F15B 11/0445; F15B 2211/50545; B66C 23/86
See application file for complete search history.

(56) References Cited

U.S. PATENT DOCUMENTS 8,689,549 B2 * 4/2014 Jene ....................... B66C 23/86
60/403
10,150,657 B2 * 12/2018 Miyoshi .............. F15B 11/0445
(Continued)

FOREIGN PATENT DOCUMENTS

DE    10-2006-040459 A1    3/2007
JP       2009-121500 A     6/2009

OTHER PUBLICATIONS

Search report issued in European Application No. 18199038.3, dated Mar. 18, 2019.
(Continued)

*Primary Examiner* — Michael Leslie
(74) *Attorney, Agent, or Firm* — Michael Best & Friedrich LLP

(57) ABSTRACT

A working machine includes a lower body, a turning body, a turning manipulating member which turns the turning body, a hydraulic motor which rotationally drives the turning body, a brake device which brakes the hydraulic motor, a main hydraulic source which supplies hydraulic oil to the hydraulic motor, and a direction control valve which controls a flow direction of the hydraulic oil according to the manipulated variable of the turning manipulating member, in which in a state where the hydraulic motor is braked by the brake device based on a manipulation of a brake manipulating member, when the turning manipulation is performed by the turning manipulating member, a brake applied to the hydraulic motor by the brake device is released with respect to turning in an indication direction indicated by the turning manipulation such that the turning body turns in the indication direction.

20 Claims, 8 Drawing Sheets

(51) Int. Cl.
    *B66C 13/20*     (2006.01)
    *B66C 23/00*     (2006.01)
    *F15B 11/10*     (2006.01)
    *F15B 13/042*     (2006.01)
    *E02F 9/12*     (2006.01)
    *F15B 11/00*     (2006.01)
    *F16H 61/4157*     (2010.01)

(52) U.S. Cl.
CPC ........ *F15B 11/003* (2013.01); *F15B 11/0445* (2013.01); *F15B 11/10* (2013.01); *F15B 13/0426* (2013.01); *B66C 2700/0392* (2013.01); *F15B 2211/30515* (2013.01); *F15B 2211/30525* (2013.01); *F15B 2211/329* (2013.01); *F15B 2211/40584* (2013.01); *F15B 2211/41527* (2013.01); *F15B 2211/428* (2013.01); *F15B 2211/6355* (2013.01); *F15B 2211/7058* (2013.01); *F15B 2211/715* (2013.01); *F16H 61/4157* (2013.01)

(56) References Cited

U.S. PATENT DOCUMENTS

2010/0263364 A1    10/2010    Tsutsui et al.
2010/0313555 A1    12/2010    Jene et al.

OTHER PUBLICATIONS

Article 94(3) Communication issued in European Application No. 18199038.3, dated Apr. 1, 2019.
Article 94(3) EPC Communication issued in European Application No. 18199038.3, dated Jun. 22, 2020.

* cited by examiner

BRAKE DEVICE FOR BRAKING A HYDRAULIC MOTOR OF A TURNING BODY IN A WORKING MACHINE

RELATED APPLICATIONS

Priority is claimed to Japanese Patent Application No. 2017-197184, filed Oct. 10, 2017, the entire content of which is incorporated herein by reference.

BACKGROUND

Technical Field

Certain embodiment of the present invention relates to a working machine typified by a crane or the like.

Description of Related Art

As a background art in the present technical field, for example, the related art discloses "a brake device of a construction machine which includes a hydraulic motor which is rotated by pressure oil from a hydraulic pump, a direction control valve which controls a flow of the pressure oil from the hydraulic pump to the hydraulic motor, a manipulating lever which manipulates the direction control valve, a brake pedal which outputs a brake command of the hydraulic motor, a valve device which decrease a return-side flow path area of the hydraulic motor according to a manipulated variable of the brake pedal" (refer to Abstract).

In the related art, when the direction control valve is positioned at a neutral position, both ports of the hydraulic motor (turning hydraulic motor) are connected to a tank, and thus, a rotation of the hydraulic motor is allowed. That is, the direction control valve is positioned at the neutral position, the hydraulic motor is in a free state (non-brake state) in which braking is not applied. In the related art, the brake pedal and the valve device are separately provided so as to apply the braking to the hydraulic motor, and it is possible to apply the braking to the rotation of the hydraulic motor by manipulating the brake pedal.

SUMMARY

According to an embodiment of the present invention, there is provided a working machine including: a lower body; a turning body which is turnably provided on the lower body; a turning manipulating member configured to turn the turning body; a hydraulic motor configured to rotationally drive the turning body according to a manipulated variable of the turning manipulating member; a brake device configured to brake the hydraulic motor; a main hydraulic source configured to supply hydraulic oil to the hydraulic motor; and a direction control valve which is provided between the main hydraulic source and the hydraulic motor and is configured to control a flow direction of the hydraulic oil according to the manipulated variable of the turning manipulating member, in which in a state where the hydraulic motor is braked by the brake device based on manipulation of a brake manipulating member, in a case where the turning manipulation is performed by the turning manipulating member, a brake applied to the hydraulic motor by the brake device is released with respect to turning in an indication direction indicated by the turning manipulation such that the turning body turns in the indication direction.

BRIEF DESCRIPTION OF THE DRAWINGS

FIG. 4 is an operation explanatory diagram of the hydraulic drive device when a change-over switch is turned on.

DETAILED DESCRIPTION

For example, a working machine such as a crane may be forced to work at a site with a steep slope or work under a strong wind. In the site with a steep slope, a turning force is generated by the own weight of the turning body. In addition, in the work under strong wind, a wind force applied to a boom provided in the turning body generates the turning force.

In the brake device disclosed in the related art, if the brake pedal is released, the brake of the hydraulic motor is released and the hydraulic motor in the non-brake state. Accordingly, when the working machine is manipulated under the above-described working environment, the working machine starts the turning in a direction opposite to an intended direction of an operator due to influences of the own weight of the turning body or the wind force, and thus, a situation where a turning manipulation is difficult may occur.

It is desirable to provide a working machine capable of being turned in an intended direction of an operator.

According to the present invention, it is possible to provide the working machine capable of being turned in an intended direction of an operator. In addition, objects, configurations, and effects other than those described above will be clarified by the description of the embodiments below.

Figure 1:
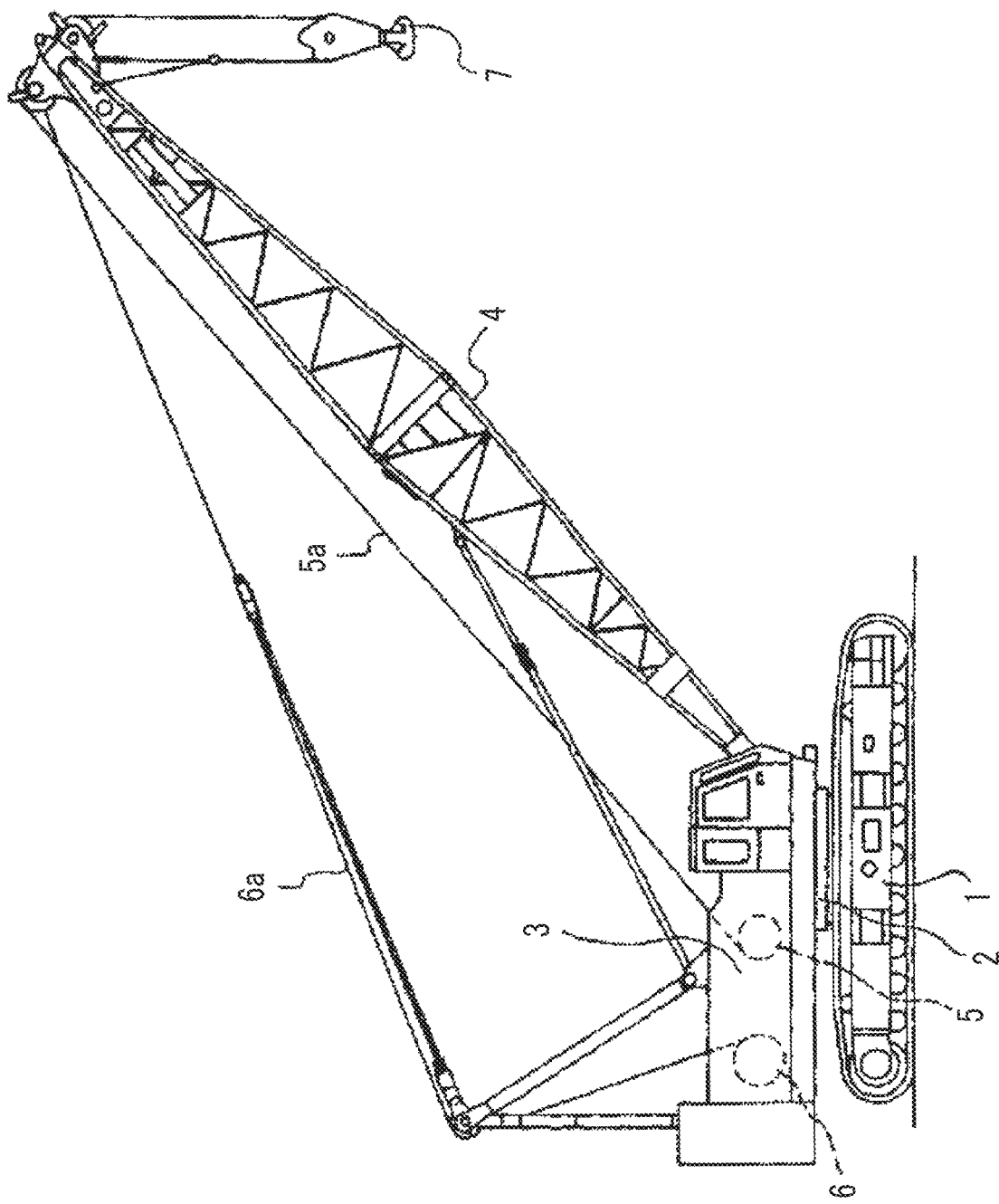
FIG. 1 is a side view of a crane according to an embodiment of the present invention.

Hereinafter, a working machine according to an embodiment of the present invention will be described. FIG. 1 is a side view of a crane which is an example of a working machine according to the present invention. As shown in FIG. 1, the crane includes a crawler type traveling body (lower body) 1, a turning body 3 which is turnably provided on the traveling body 1 via a turning ring 2, and a boom 4 which is rotatably pivoted on the turning body 3. A hoisting drum 5 and a boom derricking drum 6 are mounted on the turning body 3. A hoisting rope 5a is wound around the hoisting drum 5, the hoisting rope 5a is wound up or unwound by driving the hoisting drum 5, and thus, a hook 7 is lifted or lowered. A boom derricking rope 6a is wound around the boom derricking drum 6, the boom derricking rope 6a is wound up or unwound by driving the boom derricking drum 6, and thus, the boom 4 is undulated.

The turning ring 2 is driven by a turning hydraulic motor 12 (refer to FIG. 2), the hoisting drum 5 is driven by a hoisting hydraulic motor (not shown), and the boom derricking drum 6 is driven by an undulating hydraulic motor (not shown). Rotations of the hydraulic motors can be controlled by a brake device.

Next, a hydraulic drive device which drives each hydraulic motor will be described. However, a hydraulic drive device of a turning hydraulic motor 12 of the respective hydraulic motors will be specifically described, and descriptions of other hydraulic drive devices are omitted. Moreover, hereinafter, the turning hydraulic motor 12 is referred to as a "hydraulic motor 12".

Figure 2:
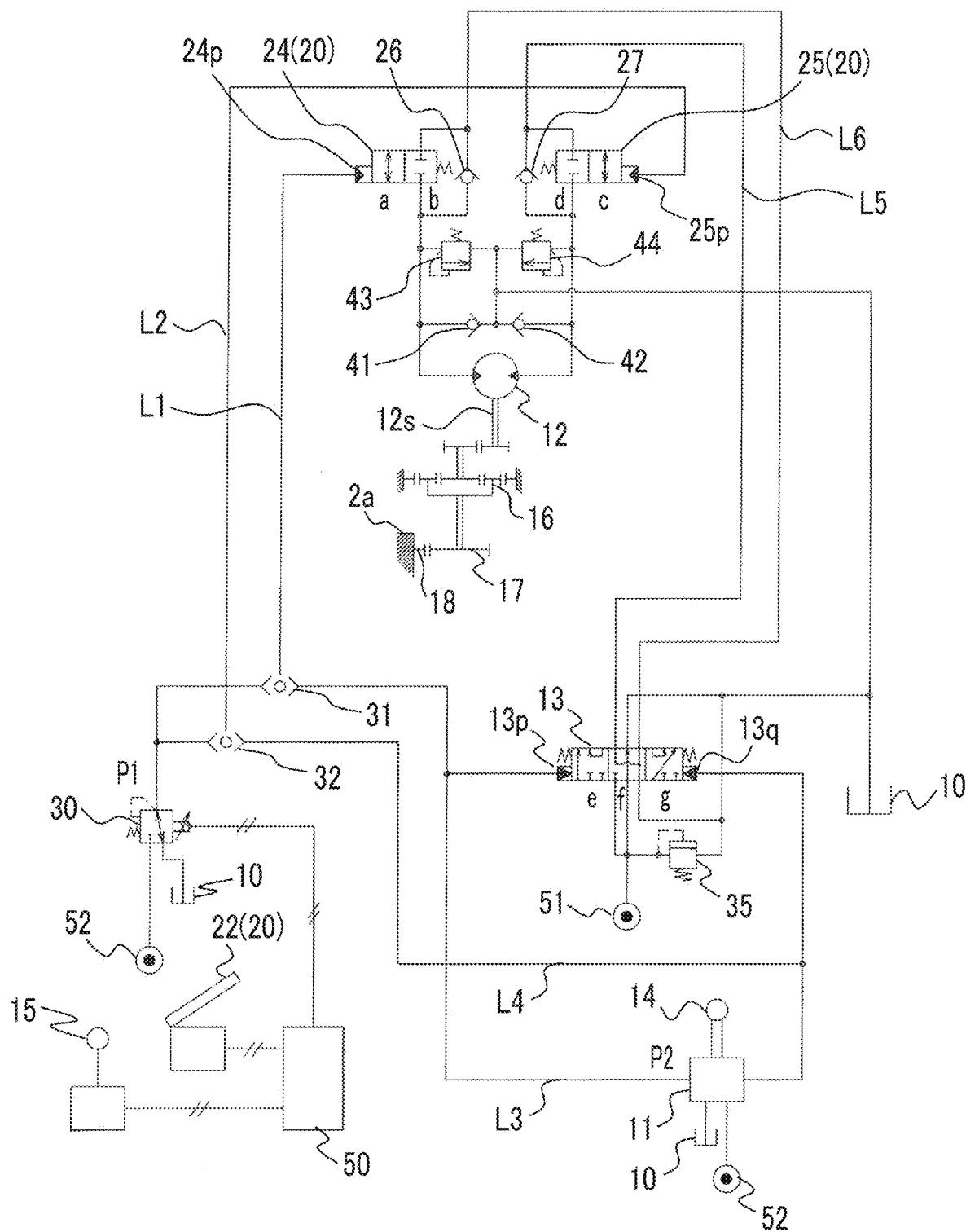
FIG. 2 is a circuit configuration diagram of a hydraulic drive device which drives a turning hydraulic motor.

FIG. 2 is a circuit configuration diagram of the hydraulic drive device which drives the hydraulic motor 12. As shown in FIG. 2, the hydraulic drive device of the hydraulic motor 12 includes a main hydraulic source 51 and a pilot hydraulic source 52 as a supply source of pressure oil. The main hydraulic source 51 is driven by an engine (not shown), and is constituted by a variable displacement hydraulic pump (not shown) which discharges hydraulic oil. The pilot hydraulic source 52 is driven by the same engine and is constituted by a fixed displacement hydraulic pump (not shown) which discharges pilot pressure oil.

The hydraulic drive device of the hydraulic motor 12 is disposed between the main hydraulic source 51 and the hydraulic motor 12, and includes a direction control valve 13 which controls a flow of the hydraulic oil from the main hydraulic source 51 to the hydraulic motor 12, a turning manipulating lever (turning manipulating member) 14 which switches the direction control valve 13 so as to turn the turning body 3, a brake device 20 which brakes the hydraulic motor 12, a brake pilot valve 30 which generate a first pilot pressure P1, a turning pilot valve 11 which generates a second pilot pressure P2, and a change-over switch (switching device) 15 for switching the hydraulic motor 12 into a non-brake state.

A rotating force of the hydraulic motor 12 is transmitted to the turning ring 2 (refer to FIG. 1) via a planetary reduction gear 16. An output shaft 12s of the hydraulic motor 12 is connected to a pinion 17 via the planetary reduction gear 16. The turning ring 2 includes an inner ring 2a which is formed in an approximately ring shape and an outer ring (not shown) which is provided on an outer peripheral side of the inner ring 2a to be rotatable relative to the inner ring 2a via a rolling body (not shown). The inner ring 2a is supported by the traveling body 1 and the outer ring is supported by the turning body 3. A ring gear 18 is formed on an inner peripheral surface of the inner ring 2a and the pinion 17 meshes with the ring gear 18. Accordingly, if the pinion 17 rotates, the inner ring 2a rotates relative to the outer ring, and thus, the turning body 3 is turned.

The direction control valve 13 can be switched to a first position e at which the hydraulic motor 12 is rotationally driven in a forward direction, a second position g at which the hydraulic motor 12 is rotationally driven in a reverse direction, and a neutral position f at which both ports of the hydraulic motor 12 and a tank 10 are connected to each other and the hydraulic motor 12 is held in a non-brake state, and the direction control valve 13 is held at the neutral position f in a normal state. That is, when the direction control valve 13 is at the neutral position f, the turning body 3 is in a free state.

The brake device 20 includes a brake pedal (brake manipulating member) 22 which is depressed by an operator, and a pair of brake control valves 24 and 25 which is positioned between the direction control valve 13 and the hydraulic motor 12 and is provided in front of and behind the hydraulic motor 12.

The first brake control valve 24 is held at a position b (closed position) by a spring force at the normal state. A first pilot pressure P1 generated in the brake pilot valve 30 or a second pilot pressure P2 generated in the turning pilot valve 11 is introduced into a first pilot port 24p of the first brake control valve 24 via a pipeline L1, and if the first pilot pressure P1 or the second pilot pressure P2 are applied, the first brake control valve 24 is switched from the position b to a position a (open position).

When the first brake control valve 24 is positioned at the position b, the flow of the hydraulic oil between the direction control valve 13 and the hydraulic motor 12 is blocked and the hydraulic motor 12 is braked. Meanwhile, when the first brake control valve is positioned at the position a, the flow of the hydraulic oil between the direction control valve 13 and the hydraulic motor 12 is allowed and the hydraulic motor 12 is in the non-brake state.

Similarly, the second brake control valve 25 is held at a position (closed position) at the normal state and the hydraulic motor 12 is braked. If the first pilot pressure P1 or the second pilot pressure P2 are introduced into a second pilot port 25p via a pipeline L2, the hydraulic motor 12 is switched from the position d to the position c (open position), and thus, the hydraulic motor 12 is in the non-brake state.

The brake pilot valve 30 is connected to a pilot hydraulic source 52, and if the brake pedal 22 is manipulated and a brake command is output, a command signal (electric signal) is input the brake pilot valve 30 via a controller 50. The brake pilot valve 30 generates the first pilot pressure P1 based on the command signal. Moreover, in the present embodiment, a solenoid proportional valve is used as the brake pilot valve 30. However, the present invention is not limited to this.

Meanwhile, the turning pilot valve 11 is connected to a pilot hydraulic source 52, and if the turning manipulating lever 14 is manipulated, the turning pilot valve 11 generates the second pilot pressure P2 according to a manipulated variable of the turning manipulating lever 14.

A high-pressure selection type first shuttle valve 31 in which a high pressure-side inlet is connected to an outlet is provided in the pipeline L1, and a similar second shuttle valve 32 is also provided in the pipeline L2. Accordingly, the pilot pressure having a higher pressure of the first pilot pressure P1 and the second pilot pressure P2 is applied to the first pilot port 24p of the first brake control valve 24. Similarly, the pilot pressure having a higher pressure of the first pilot pressure P1 and the second pilot pressure P2 is applied to the second pilot port 25p of the second brake control valve 25.

Figure 3:
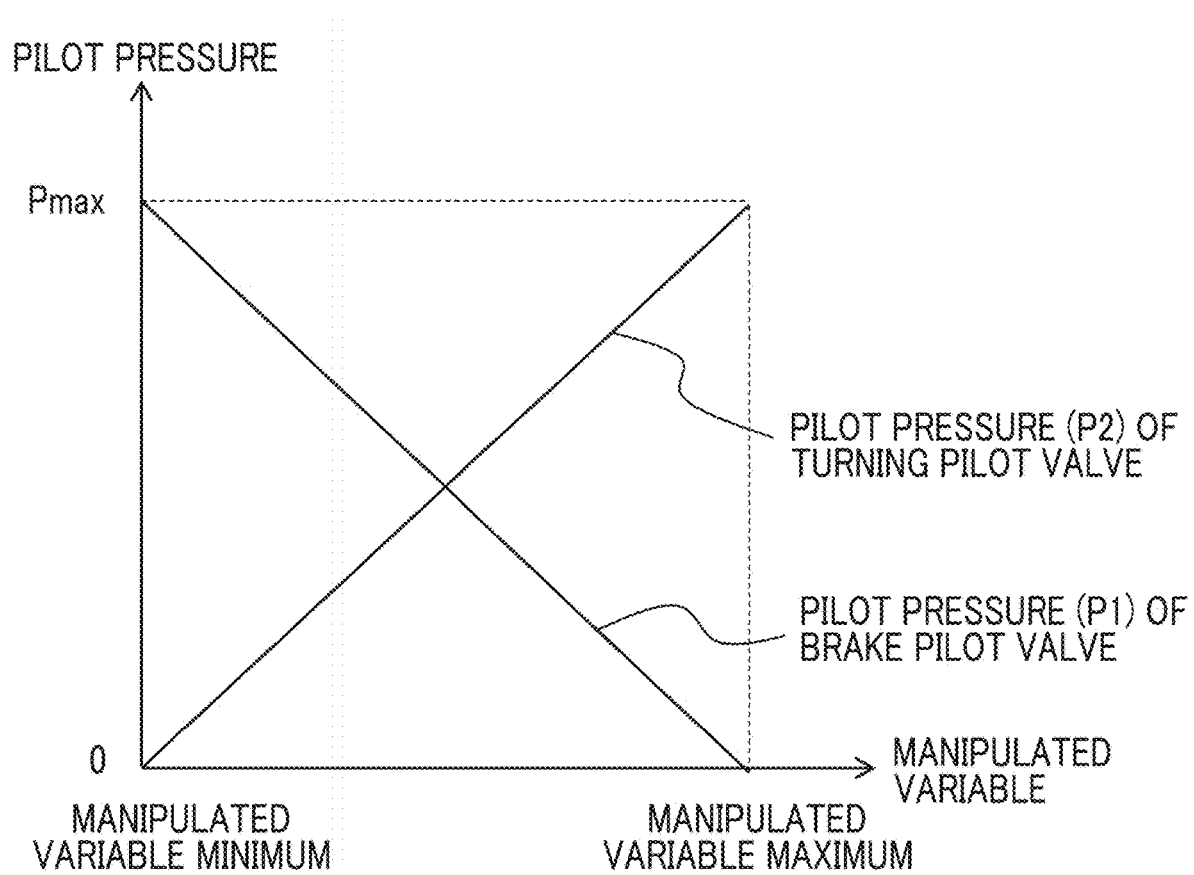
FIG. 3 is a graph showing a relationship between a manipulated variable and a pilot pressure of each of a turning pilot valve and a brake pilot valve.

FIG. 3 is a graph showing a relationship between the manipulated variable and the pilot pressure of each of the turning pilot valve 11 and the brake pilot valve 30. As shown in FIG. 3, the brake pilot valve 30 has characteristics that the first pilot pressure P1 becomes a maximum Pmax when the manipulated variable of brake pedal 22 is minimum and the first pilot pressure P1 becomes zero when the manipulated variable is maximum. That is, the brake pilot valve 30 has characteristics that the first pilot pressure P1 is decreased by the control of the controller 50 if the brake pedal 22 is depressed.

Meanwhile the turning pilot valve 11 has characteristics that the second pilot pressure P2 becomes zero when the manipulated variable of the turning manipulating lever 14 is minimum and the second pilot pressure P2 becomes maximum Pmax when the manipulated variable is maximum. In addition, FIG. 3 shows the characteristics that the relationship between the pilot pressure and the manipulated variable is linear. However, the relationship between the pilot pressure and the manipulated variable is not limited to this.

In addition, a first check valve 26 is provided in parallel with the first brake control valve 24, and a second check valve 27 is provided in parallel with the second brake control valve 25. Both the first check valve 26 and the second check valve 27 allows the hydraulic oil from the main hydraulic source 51 to flow in a direction toward the hydraulic motor 12 and prevents the flow in a direction opposite to the direction toward the hydraulic motor 12. In addition, in FIG. 2, a reference numeral 10 indicates the tank, a reference numeral 35 indicates a relief valve, reference numerals 41 and 42 indicate check valves, and reference numerals 43 and 44 indicate relief valves.

Next, an operation of the hydraulic drive device of the hydraulic motor 12 will be described with reference to FIGS. 4 to 7. In addition, in each drawing, bold lines indicate the pilot pressure or the flow of the hydraulic oil, and square surrounding lines indicate positions of the valves.

When Change-Over Switch is Turned-On

Figure 4:
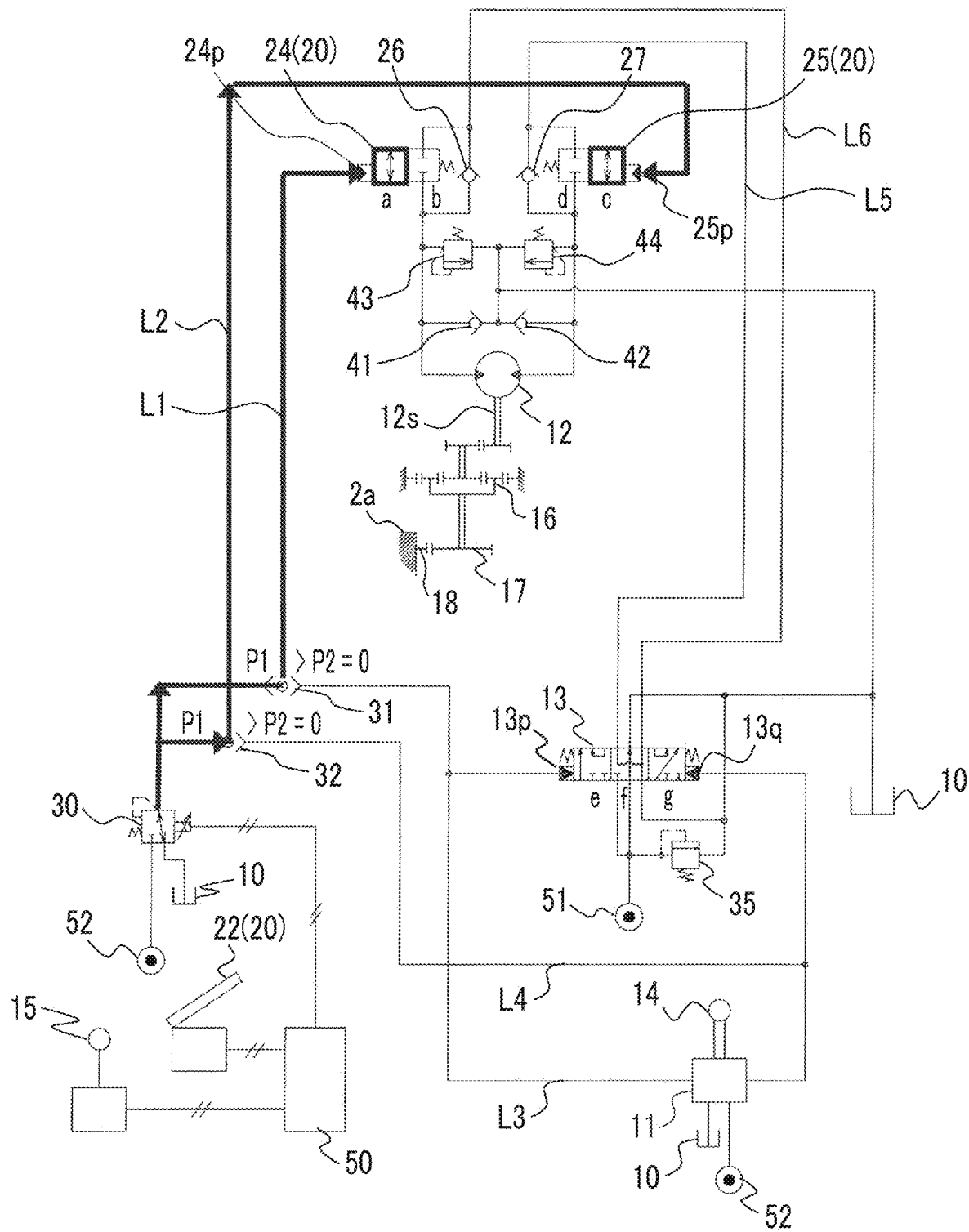

FIG. 4 is an operation explanatory diagram of the hydraulic drive device when the change-over switch is turned on. As shown in FIG. 4, when the change-over switch 15 is turned on, the brake pilot valve 30 generates the first pilot pressure P1 based on the command signal from the controller 50. Meanwhile, since the turning manipulating lever 14 is not manipulated, the first pilot pressure P1 is selected in the first shuttle valve 31 and the second shuttle valve 32.

Accordingly, the first pilot pressure P1 is applied to the first pilot port 24p of the first brake control valve 24 via the pipeline L1, and simultaneously, the first pilot pressure P1 is applied to the second pilot port 25p of the second brake control valve 25 via the pipeline L2. Therefore, the first brake control valve 24 is switched to the position a (open position), and the second brake control valve 25 is switched to the position c (open position). Accordingly, the hydraulic motor 12 is in the non-brake state. In this state, if the operator manipulates the turning manipulating lever 14, operability similar to that of the related art can be realized.

When Brake Pedal is Depressed

Figure 5:
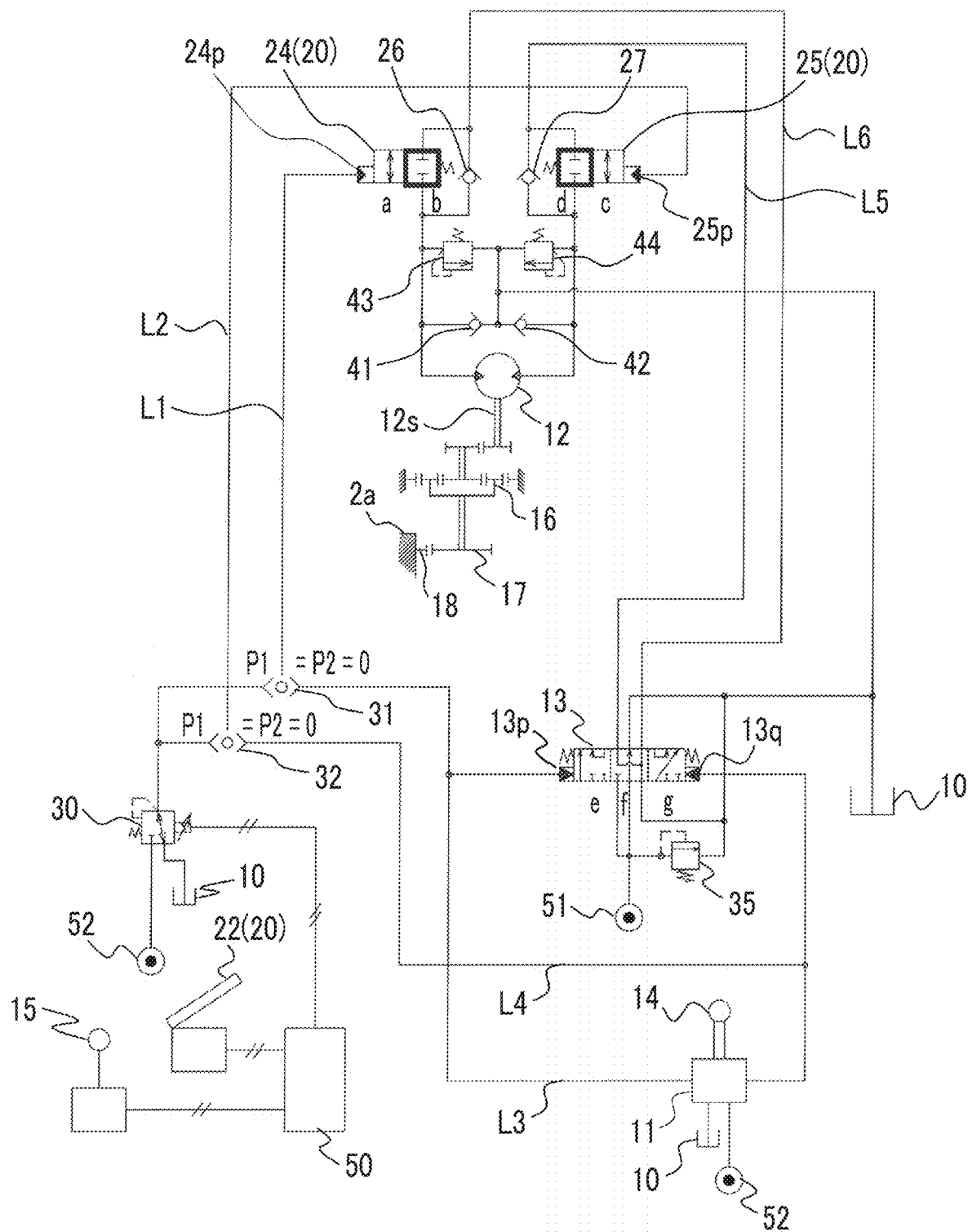
FIG. 5 is an operation explanatory diagram of the hydraulic drive device at the time of maximum depression of a brake pedal.

FIG. 5 is an operation explanatory diagram of the hydraulic drive device at the time of maximum depression of the brake pedal 22. As described above, at the time of the maximum depression of the brake pedal 22, the first pilot pressure P1 is generated from the brake pilot valve 30. That is, the first pilot pressure P1=0 is satisfied (refer to FIG. 3). Meanwhile, since the turning manipulating lever 14 is not manipulated, the second pilot pressure P2 also becomes 0. Accordingly, the first brake control valve 24 is switched to the position b (closed position) by the spring force, the second brake control valve 25 is switched to the position d (closed position) by the spring force, and the hydraulic motor 12 is braked. That is, since the brake pedal 22 is depressed by the operator, even in a state where the direction control valve 13 is in the neutral position f, the brake can be applied to the hydraulic motor 12. Accordingly, even in a case where a work is performed in a site with a steep slope or a work is performed under strong wind, the brake pedal 22 can be depressed so as to apply the brake to the hydraulic motor 12, and thus, the turning body 3 is not rotated by influences of the own weight or the wind.

Brake Pedal Depression+Turning Manipulation in X Direction

Figure 6:
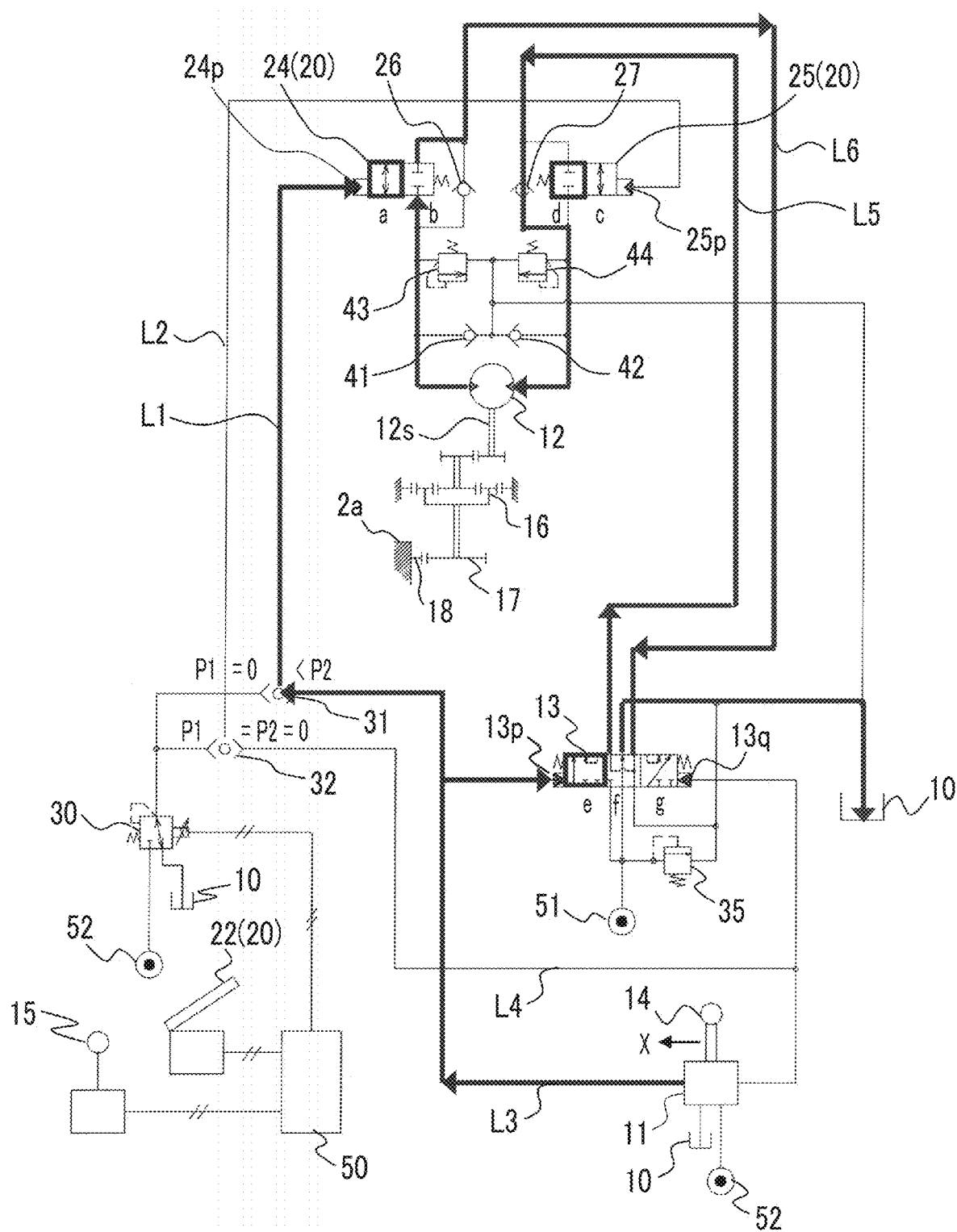
FIG. 6 is an operation explanatory diagram of the hydraulic drive device in a case where a turning manipulating lever is manipulated in an X direction at the time of the maximum depression of the brake pedal.

FIG. 6 is an operation explanatory diagram of the hydraulic drive device in a case where the turning manipulating lever 14 is manipulated in an X direction at the time of the maximum depression of the brake pedal 22. As described above, at the time of the maximum depression of the brake pedal 22, the first pilot pressure P1 is not generated from the brake pilot valve 30. That is, the first pilot pressure P1=0 is satisfied.

If the turning manipulating lever 14 is manipulated in the X direction, the second pilot pressure P2 is generated from the turning pilot valve 11, and the second pilot pressure P2 is introduced into the first shuttle valve 31 via the pipeline L3. Since the first pilot pressure P1 is zero, the first shuttle valve 31 selects the high pressure-side second pilot pressure P2, and thus, the second pilot pressure P2 is applied to the first pilot port 24p of the first brake control valve 24. Therefore, the first brake control valve 24 is switched to the position a (open position). Meanwhile, since the pilot pressure is not applied to the second pilot port 25p of the second brake control valve 25, the second brake control valve is held at the position d (closed position) by the spring force.

In addition, the turning manipulating lever 14 is manipulated in the X direction, and thus, the second pilot pressure P2 is applied to a pilot port 13p of the direction control valve 13, and the direction control valve 13 is switched to the first position e. Accordingly, as shown by arrows in FIG. 6, the hydraulic oil discharged from the main hydraulic source 51 flows through the direction control valve 13, the second check valve 27, the hydraulic motor 12, the first brake control valve 24, and the direction control valve 13 in this order, and is returned to the tank 10. Therefore, the turning manipulating lever 14 can be manipulated so as to turn the turning body 3 in a desired direction while the brake pedal 22 is depressed by the operator and the brake is applied to the hydraulic motor 12. In this case, since the brake is applied the hydraulic motor 12 in the rotation direction opposite to the manipulation direction until the manipulation of the turning manipulating lever 14 starts, the turning body 3 is not rotated in the reverse direction by influences of the own weight or the wind. Therefore, the turning manipulation can be performed in only an intended direction of the operator.

Brake Pedal Depression+Turning Manipulation in Y Direction

Figure 7:
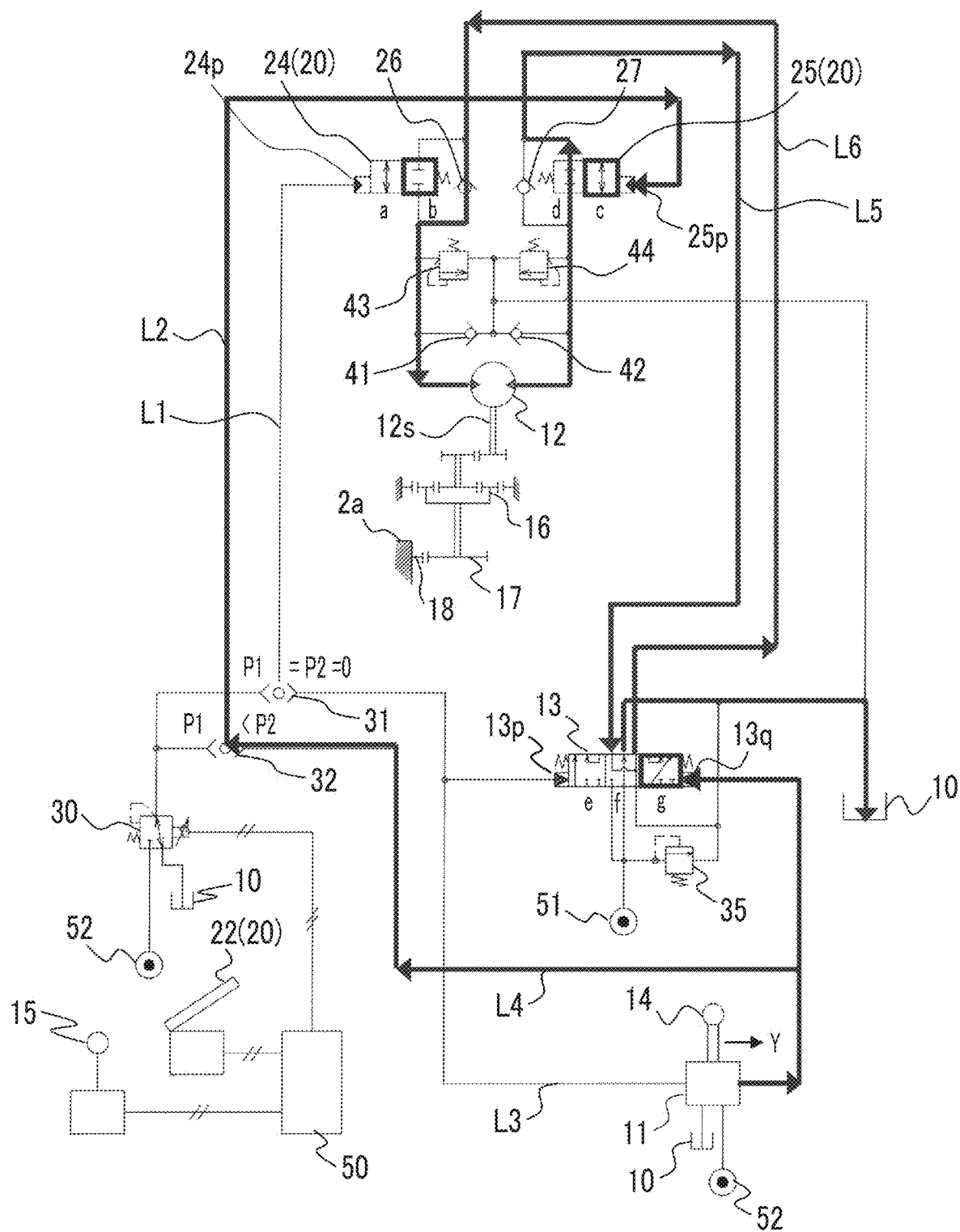
FIG. 7 is an operation explanatory diagram of the hydraulic drive device in a case where the turning manipulating lever is manipulated in a Y direction at the time of the maximum depression of the brake pedal.

FIG. 7 is an operation explanatory diagram of the hydraulic drive device in a case where the turning manipulating lever 14 is manipulated in the Y direction at the time of the maximum depression of the brake pedal 22. Even in this case, since the brake pedal 22 is depressed, the first pilot pressure P1=0 is satisfied.

If the turning manipulating lever 14 is manipulated in the Y direction, the second pilot pressure P2 is generated from the turning pilot valve 11, and the second pilot pressure P2 is introduced into the second shuttle valve 32 via the pipeline L4. Since the first pilot pressure P1 is zero, the second shuttle valve 32 selects the high pressure-side second pilot pressure P2, and thus, the second pilot pressure P2 is applied to the second pilot port 25p of the second brake control valve 25. Therefore, the second brake control valve 25 is switched to the position c (open position). Meanwhile, since the pilot pressure is not applied to the first pilot port 24p of the first brake control valve 24, the first brake control valve is held at the position b (closed position) by the spring force.

In addition, the turning manipulating lever 14 is manipulated in the Y direction, and thus, the second pilot pressure P2 is applied to a pilot port 13q of the direction control valve 13, and the direction control valve 13 is switched to the second position g. Accordingly, as shown by arrows in FIG. 7, the hydraulic oil discharged from the main hydraulic source 51 flows through the direction control valve 13, the first check valve 26, the hydraulic motor 12, the second brake control valve 25, and the direction control valve 13 in this order, and is returned to the tank 10. Accordingly, similarly to the case of FIG. 6, the turning manipulating lever 14 can be manipulated while the brake pedal 22 is depressed by the operator and the brake is applied to the hydraulic motor 12.

As described above, according to the present embodiment, since the turning manipulation can be performed while the brake pedal 22 is depressed and the brake is applied to the hydraulic motor 12, even in the case where the crane is installed in a terrain with a steep slope or a case where a work is performed under strong wind, the turning body 3 is not rotated in the reverse direction under influences of the own weight of the turning body 3 or the wind, and the turning manipulation can be safely and reliably performed in the intended direction of the operator. In addition, the hydraulic motor 12 can be set to the non-brake state immediately by releasing the brake pedal 22, and thus, unlike the related art, operability inherent to the crane of the type in which the direction control valve 13 is in the neutral position f in the normal state is not be impaired. In addition, by turning off the change-over switch 15, it is possible to switch to manipulation characteristics of the type in which the hydraulic motor 12 is in the brake state without using the brake pedal 22.

Other Embodiments

It should be understood that the invention is not limited to the above-described embodiment, but may be modified into various forms on the basis of the spirit of the invention. Additionally, the modifications are included in the scope of the invention. Although the embodiment shows a preferable example, it is possible for those skilled in the art to realize various replacements, modifications, or improvements from contents disclosed in the present specification, and these are included in the technical scope described in the appended claims.

Figure 8:
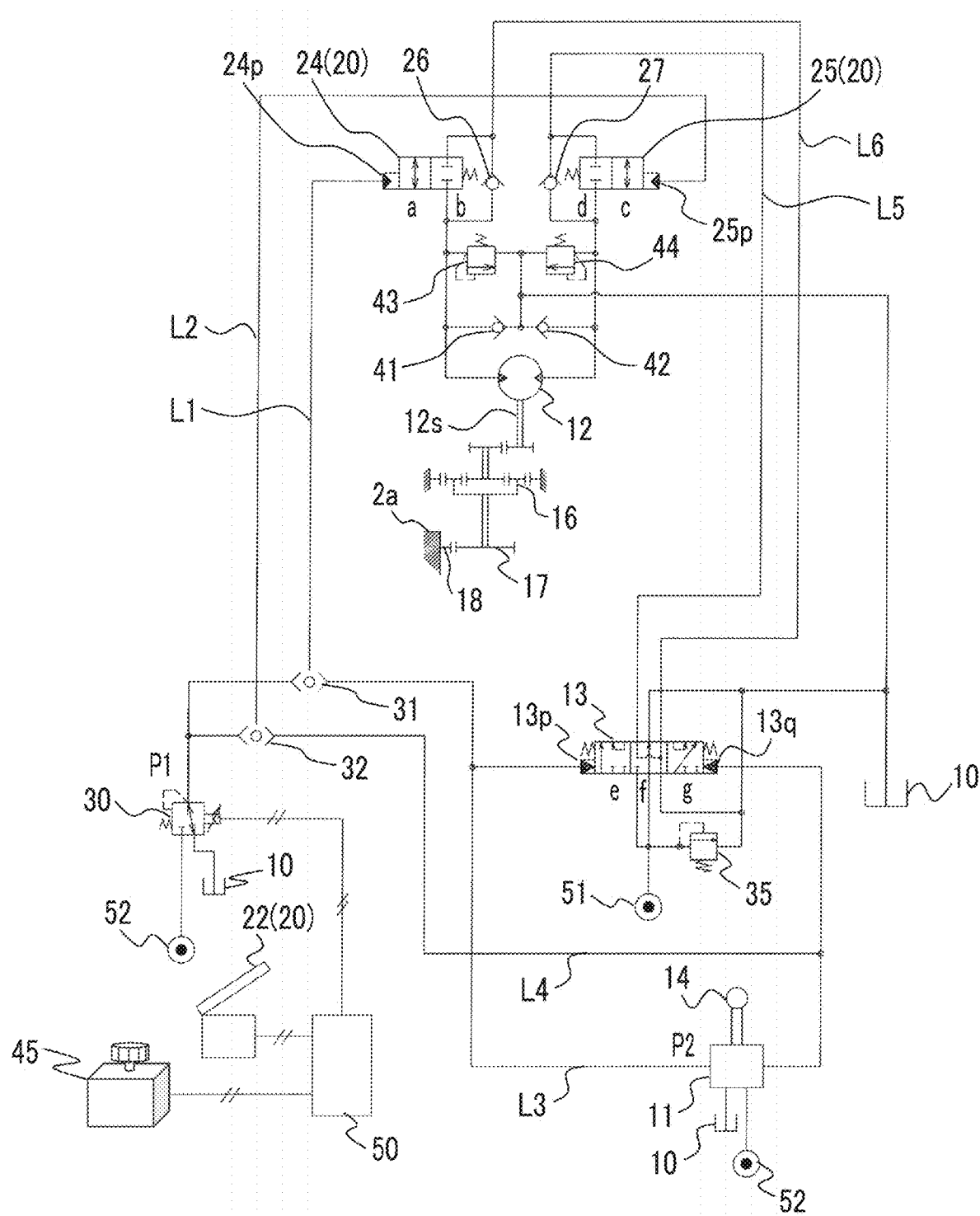
FIG. 8 is a circuit configuration diagram showing a modification example of the hydraulic drive device shown in FIG. 2.

FIG. 8 is a circuit configuration diagram of a hydraulic drive device according to a modification example of the present embodiment. As shown in FIG. 8, a configuration may be adopted in which the setting of the brake is switched by using a variable resistance dial 45 which is an example of a device having a dial type setting changing function, instead of the change-over switch 15. In this case, when the brake pedal 22 is released, a set braking force is generated such that the operability when the turning manipulating lever 14 is returned can be changed. Needless to say, when the brake pedal 22 is depressed, a braking force can be generated. Accordingly, it goes without saying that the turning manipulation can safely and reliably be performed in the intended direction of the operator.

In addition, in the above-described embodiment, the pilot pressure signal is used as the control signal. However, an electric signal may be used instead of the pilot pressure signal. For example, in the above-described embodiment, the configuration is described in which the first brake control valve 24 and the second brake control valve 25 are switched by using the pilot hydraulic source 52. However, instead of this configuration, a pair of electromagnetic brake control valves can be used so as to control the operations of the pair of brake control valves by an electric signal from the controller 50. That is, the control signal of the brake device 20 is not limited to the hydraulic signal.

In addition, for example, the following configuration can be adopted. That is, it is detected whether or not an external force is applied to the turning body 3 using a pressure sensor (not shown) instead of the first brake control valve 24 and the second brake control valve 25, the manipulation direction of the turning manipulating lever 14, the pilot pressure generated in the turning manipulating lever 14, and various signals such as the pressure in front of and behind the hydraulic motor 12 are input to the controller 50, the controller 50 prevents the turning body 3 from turning in a direction in which the external force is applied, and the controller 50 controls the brake of the hydraulic motor 12 such that the turning body 3 is rotated in only the manipulation direction of the turning manipulating lever 14.

For example, a configuration may be adopted, in which the direction control valve 13 is manipulated using a manipulation device such as a turning manipulation button or a turning manipulation pedal instead of the turning manipulating lever 14. In addition, the brake command of the hydraulic motor 12 may be output using a brake device such as a brake lever or a brake switch instead of the brake pedal 22. Moreover, a proportion valve controlled by a pilot pressure may be used instead of the solenoid proportional valve serving as the brake pilot valve 30. In addition, in the above-described embodiment, the brake device 20 is applied to the hydraulic motor (turning hydraulic motor) 12. However, the brake device 20 can be applied to other hydraulic motors mounted on the crane. In addition to a mobile crane, for example, the above-described embodiment can also be applied to a fixed type crane which is installed in a harbor or the like and does not have a traveling function, or all working machines such as a hydraulic excavator.

It should be understood that the invention is not limited to the above-described embodiment, but may be modified into various forms on the basis of the spirit of the invention. Additionally, the modifications are included in the scope of the invention.

What is claimed is:

1. A working machine comprising:
    a lower body;
    a turning body which is turnably provided on the lower body;
    a turning manipulating member configured to control a turning manipulation of the turning body;
    a hydraulic motor configured to rotationally drive the turning body according to a manipulated variable of the turning manipulating member;
    a brake device configured to brake the hydraulic motor;
    a main hydraulic source configured to supply hydraulic oil to the hydraulic motor; and
    a direction control valve which is provided between the main hydraulic source and the hydraulic motor and is configured to control a flow direction of the hydraulic oil according to the manipulated variable of the turning manipulating member,
    wherein in a state where the hydraulic motor is braked by the brake device based on a manipulation of a brake manipulating member, in a case where the turning manipulation is performed by the turning manipulating member, a brake applied to the hydraulic motor by the brake device is released with respect to turning in an intended direction indicated by the turning manipulation such that the turning body turns in the intended direction while being inhibited from turning in a direction opposite to the intended direction.

2. The working machine according to claim 1,
wherein the direction control valve includes a first position at which the hydraulic motor is rotationally driven in a forward direction, a second position at which the hydraulic motor is rotationally driven in a reverse direction, and a neutral position at which both ports of the hydraulic motor and a tank are connected to each other and the hydraulic motor is held in a non-brake state, and
wherein the direction control valve is held at the neutral position in the normal state.

3. The working machine according to claim 1,
wherein the brake device includes a pair of brake control valves which is:
provided in front of and behind the hydraulic motor between the hydraulic motor and the direction control valve, and
configured to operate between a closed position at which the flow of the hydraulic oil is blocked to brake the hydraulic motor and an open position at which the flow of the hydraulic oil is allowed.

4. The working machine according to claim 3,
wherein the brake manipulating member configured to output a brake command of the hydraulic motor, and
wherein when the brake command is output from the brake manipulating member, each of the pair of brake control valves is in a brake state at which the brake control valve is held at the closed position.

5. The working machine according to claim 4, further comprising:
a pilot hydraulic source for generating a pilot pressure,
wherein the direction control valve is operated by the pilot pressure generated according to the manipulated variable of the turning manipulating member so as to control the flow direction of the hydraulic oil.

6. The working machine according to claim 5,
wherein in the brake state, when an operator manipulates the turning manipulating member, the pilot pressure is applied to a first brake control valve which is one of the pair of brake control valves, and the first brake control valve is switched to the open position, and
wherein when the hydraulic oil discharged from the main hydraulic source bypasses a second brake control valve which is the other of the pair of brake control valves and is supplied to the hydraulic motor, the hydraulic motor is driven in the intended direction in the brake state.

7. The working machine according to claim 6, further comprising:
a first check valve which is provided in parallel with the first brake control valve and is configured to allow the hydraulic oil discharged from the main hydraulic source to flow in a direction toward the hydraulic motor and to prevent a flow in a direction opposite to the direction toward the hydraulic motor; and
a second check valve which is provided in parallel with the second brake control valve and is configured to allow the hydraulic oil discharged from the main hydraulic source to flow in the direction toward the hydraulic motor and to prevent a flow in the direction opposite to the direction toward the hydraulic motor.

8. The working machine according to claim 7, further comprising:
a brake pilot valve which is connected to the pilot hydraulic source and is configured to generate a first pilot pressure corresponding to the brake command output from the brake manipulating member.

9. The working machine according to claim 8, further comprising:
a turning pilot valve which is connected to the pilot hydraulic source and is configured to generate a second pilot pressure corresponding to the manipulated variable of the turning manipulating member.

10. The working machine according to claim 9, further comprising:
a first shuttle valve configured to select a higher pilot pressure of the first pilot pressure and the second pilot pressure and to apply the selected pilot pressure to a first pilot port of the first brake control valve; and
a second shuttle valve configured to select a higher pilot pressure of the first pilot pressure and the second pilot pressure and to apply the selected pilot pressure to a second pilot port of the second brake control valve.

11. The working machine according to claim 10, further comprising:
wherein the brake pilot valve is operated to generate a lowest first pilot pressure when a manipulated variable of the brake manipulating member is maximum and generate a highest first pilot pressure when the manipulated variable of the brake manipulating member is minimum, and
wherein the turning pilot valve is operated to generate a highest second pilot pressure when the manipulated variable of the turning manipulating member is maximum and generate a lowest second pilot pressure when the manipulated variable of the turning manipulating member is minimum.

12. The working machine according to claim 11, further comprising:
wherein each of the pair of brake control valves further includes a switching device configured to be held at a closed position in a normal state of the brake control valve and to switch each of the pair of brake control valves from the closed position to an open position, and
wherein when the switching device is turned on, the first pilot pressure generated in the brake pilot valve is applied to the first pilot port and the second pilot port, and each of the pair of brake control valves is switched to the open position.

13. A working machine comprising:
a lower body;
a turning body which is turnably provided on the lower body;
a turning manipulating member configured to turn the turning body;
a hydraulic motor configured to rotationally drive the turning body according to a manipulated variable of the turning manipulating member;
a brake device configured to brake the hydraulic motor;
a main hydraulic source configured to supply hydraulic oil to the hydraulic motor;
a direction control valve which is provided between the main hydraulic source and the hydraulic motor and is configured to control a flow direction of the hydraulic oil according to the manipulated variable of the turning manipulating member; and
a pilot hydraulic source for generating a pilot pressure,
wherein in a state where the hydraulic motor is braked by the brake device based on a manipulation of a brake manipulating member, in a case where the turning manipulation is performed by the turning manipulating member, a brake applied to the hydraulic motor by the brake device is released with respect to turning in an indication direction indicated by the turning manipulation such that the turning body turns in the indication direction, wherein the direction control valve is operated by the pilot pressure generated according to the manipulated variable of the turning manipulating member so as to control the flow direction of the hydraulic oil, wherein the brake device includes a pair of brake control valves which is provided in front of and behind the hydraulic motor between the hydraulic motor and the direction control valve and is configured to operate between a closed position at which the flow of the hydraulic oil is blocked to brake the hydraulic motor and an open position at which the flow of the hydraulic oil is allowed, and the brake manipulating member configured to output a brake command of the hydraulic motor, wherein when the brake command is output from the brake manipulating member, each of the pair of brake control valves is in a brake state at which the brake control valve is held at the closed position, wherein in the brake state, when an operator manipulates the turning manipulating member, the pilot pressure is applied to a first brake control valve which is one of the pair of brake control valves, and the first brake control valve is switched to the open position, and wherein when the hydraulic oil discharged from the main hydraulic source bypasses a second brake control valve which is the other of the pair of brake control valves and is supplied to the hydraulic motor, the hydraulic motor is driven in the indication direction in the brake state.

14. The working machine according to claim 13, further comprising:

a first check valve which is provided in parallel with the first brake control valve and is configured to allow the hydraulic oil discharged from the main hydraulic source to flow in a direction toward the hydraulic motor and to prevent a flow in a direction opposite to the direction toward the hydraulic motor; and a second check valve which is provided in parallel with the second brake control valve and is configured to allow the hydraulic oil discharged from the main hydraulic source to flow in the direction toward the hydraulic motor and to prevent a flow in the direction opposite to the direction toward the hydraulic motor.

15. The working machine according to claim 14, further comprising:

a brake pilot valve which is connected to the pilot hydraulic source and is configured to generate a first pilot pressure corresponding to the brake command output from the brake manipulating member;

a turning pilot valve which is connected to the pilot hydraulic source and is configured to generate a second pilot pressure corresponding to the manipulated variable of the turning manipulating member;

a first shuttle valve configured to select a higher pilot pressure of the first pilot pressure and the second pilot pressure and to apply the selected pilot pressure to a first pilot port of the first brake control valve; and a second shuttle valve configured to select a higher pilot pressure of the first pilot pressure and the second pilot pressure and to apply the selected pilot pressure to a second pilot port of the second brake control valve, wherein the brake pilot valve is operated to generate the lowest first pilot pressure when a manipulated variable of the brake manipulating member is maximum and generate the highest first pilot pressure when the manipulated variable of the brake manipulating member is minimum, and wherein the turning pilot valve is operated to generate the highest second pilot pressure when the manipulated variable of the turning manipulating member is maximum and generate the lowest second pilot pressure when the manipulated variable of the turning manipulating member is minimum.

16. The working machine according to claim 15, wherein each of the pair of brake control valves further includes a switching device configured to be held at the closed position in a normal state of the brake control valve and to switch each of the pair of brake control valves from the closed position to the open position, and wherein when the switching device is turned on, the first pilot pressure generated in the brake pilot valve is applied to the first pilot port and the second pilot port, and each of the pair of brake control valves is switched to the open position.

17. A working machine comprising:

a hydraulic motor configured to apply, to a turning body when a flow of hydraulic oil is applied to the hydraulic motor via a pipeline, a rotating force that rotates the turning body in a forward direction; and a brake device configured to apply, along a pathway other than the pipeline, a braking force that prevents the hydraulic motor from rotating the turning body in a reverse direction while allowing the hydraulic motor to rotate the turning body in the forward direction, wherein the forward direction is opposite to the reverse direction.

18. The working machine according to claim 17, wherein the brake device is configured to apply, along another pathway other than the pipeline, a braking force that prevents the hydraulic motor from rotating the turning body in the forward direction while allowing the hydraulic motor to rotate the turning body in the reverse direction.

19. The working machine according to claim 18, wherein the hydraulic motor configured to apply, to the turning body when the flow of the hydraulic oil is applied to the hydraulic motor via another pipeline, a rotating force that rotates the turning body in the reverse direction.

20. The working machine according to claim 17, wherein the brake device is configured to apply, to the hydraulic motor when no flow of the hydraulic oil is applied to the hydraulic motor, a brake that prevents the hydraulic motor from rotating the turning body in either the forward direction or the reverse direction.

\* \* \* \* \*